Aug. 18, 1925.

E. J. FIRQUAIN

FENDER BRACE

Filed Nov. 17, 1922

1,550,247

Inventor
E. J. Firquain,
By
Attorney

Patented Aug. 18, 1925.

1,550,247

UNITED STATES PATENT OFFICE.

ELMER J. FIRQUAIN, OF ROSEDALE, KANSAS, ASSIGNOR TO METAL PRODUCTS CO., OF DES MOINES, IOWA, A CORPORATION OF IOWA.

FENDER BRACE.

Application filed November 17, 1922. Serial No. 601,553.

*To all whom it may concern:*

Be it known that ELMER J. FIRQUAIN, a citizen of the United States of America, residing at Rosedale, in the county of Wyandotte and State of Kansas, has invented new and useful Improvements in Fender Braces, of which the following is a specification.

The object of my invention is to provide a fender brace structure especially adapted for Ford automobiles, which is simple, durable, comparatively inexpensive in construction and readily adapted to be installed upon a pair of spaced fenders of the automobile.

Still a further object is to provide a fender brace for a pair of spaced fenders comprising clamp members adapted to fit upon and engage the fenders and to be connected together by a pair of separable tie rods, which are adjustable for adjusting the position of the fenders relative to each other, and pieces carried by the fender brace to engage the inner marginal bead of the fenders.

Still a further object is to provide a fender brace wherein the fenders may be drawn toward each other and held against any twisting movement when being adjusted or drawn toward each other and held against any further inward movement after they are adjusted.

Still a further object is to provide a fender brace including a pair of fender engaging members and separable tie rods interposed between the fender engaging members and operatively connected therewith in such manner as to form a jaw between the tie rods and the fender engaging members for receiving the inner marginal bead of the fenders and causing a gripping action to be had with the inner marginal bead of the fenders when tension is applied to the tie rods.

Still a further object is to provide a fender brace wherein the fender engaging member and the tie rod are normally separably connected, and when the parts are in horizontal position or operative position, then a non-removable connection is formed between the fender engaging member and the tie rod.

Still a further object is to provide a fender brace including a number of collapsibly or separably connected parts wherein the fender brace may be adapted for packing in a package of considerably less length than the overall length of the fender brace itself.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
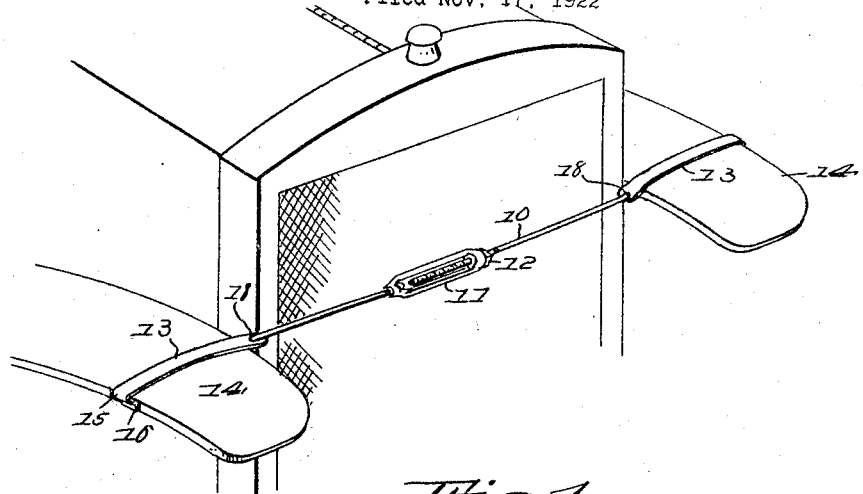
Figure 1 is a perspective view of a fender brace embodying the invention applied in the operative position to the fenders of a motor vehicle a portion of which is indicated in outline.
Figure 2:
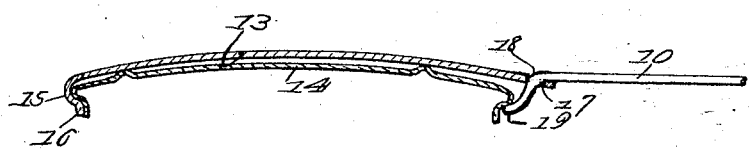
Figure 2 is a detail view showing one end of the brace and indicating the fender in cross section.
Figure 3:
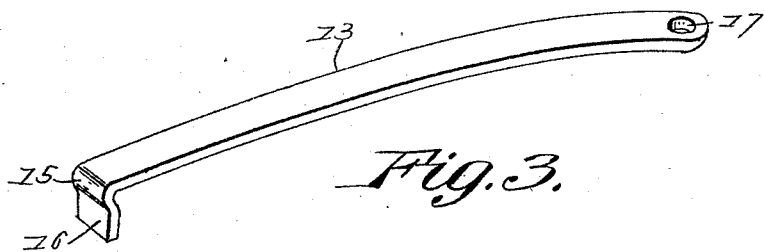
Figure 3 is a detail view of the fender clamp detached.

The device consists essentially of a sectional rod 10 having its members connected by a suitable adjusting device such as a turn buckle 11 with which may be associated a lock nut 12, and the extremities of said rod are provided with means for engaging clamps 13 disposed in engaging and spanning relation with the vehicle wheel fenders 14. In the construction illustrated each clamp member consists of a strap or band of metal of a length slightly exceeding the width of the fender with its outer end doubled upon itself to form an edge engaging hook 15 of which the extremity may be turned down to form a lip 16, and at its inner end the strap or band is arranged to project slightly beyond the edge of the fender and it is provided with an opening 17 for engagement by an offset or hook 18 in the adjacent end of the brace rod. This offset or band terminates in an outwardly deflected tongue 19 which extends under the inner edge of the fender and serves when the brace is tightened to cooperate with the strap hook which engages the outer edge of the fender, to firmly clasp or clamp the fender so that by the proper adjustment of the brace rod sections through the turn buckle or other means provided for that purpose the fenders may be properly positioned with relation to the vehicle body and effectively reinforced against distorting or displacing strains.

Having described the invention, what is claimed as new and useful is:—

1. As an article of manufacture, a pair of spring leaf wheel fender clamps of partially arcuate contour and adapted to be additionally bent to engage and conform to the transverse contour of the fenders, the remote ends of the clamps being downwardly and inwardly turned to engage with the outer remote edges of the fenders, the adjacent ends of the clamps extending toward each other and beyond the adjacent edges of the fenders and provided with apertures, a pair of rod sections axially disposed with their outer portions terminating in outwardly and downwardly turned hooks or horns to be inserted through apertures of the adjacent ends of the clamps, the bent portions intermediate the hooks or horns and the bodies of the rod sections engaging with the apertures, the downwardly and outwardly turned hooks or horns engaging under the adjacent marginal edges of the fenders, thereby additionally bending the clamps and insuring a secure engagement with the fenders, the adjacent end portions of the clamps being additionally bent to insure a tight engagement of the rod sections with the fenders, and means adjustably connecting the adjacent ends of the rod sections.

2. The combination with spaced fenders of an automobile, of a pair of clamps, each consisting of a plate for transverse disposition upon the fenders, said plates having hooks upon their outer ends for detachably engaging the outer edges of the fenders, the inner ends of said plates having perforations therein, a pair of tie rods having their inner ends adjustably connected, the outer ends of said rods having offset shanks for engagement in the perforations, said shanks terminating in jaws adapted to engage the beads of the fenders when stress is applied to the rods in one direction.

3. A fender brace comprising a member having a hook at one end, said hook being adapted to engage the outer edge of the fender of an automobile, a second member pivotally connected to the other end of said first named member and having an integral projection adapted to engage underneath the inner edge of the fender, said second named member extending in substantial alignment with the first named member and adapted, when tensioned, to effect gripping action of itself and the first named member on opposite sides of the fender.

4. A brace for fenders having a clamp member for each fender of a pair, each clamp member being provided with means adjacent one end for connection to the outer edge portions of the fenders, separably connected rods, said rods being pivoted on substantially vertical axes to the inner ends of the clamp members and disposed below the same and engageable with the inner edge portions of the fenders outwardly beyond the pivots of the rods, whereby said rods when separated may be operated as levers on said axes during application and removal of the parts to fenders.

5. A fender brace comprising a pair of clamp members each having a hook at one end adapted to engage the outer edge of a fender of an automobile, a second pair of members each pivotally connected to the free end of one of said first members and a pair of projections each adapted to engage underneath the inner edge of the fenders for holding the pair of clamp members relative to the fenders, said second named members when extending in substantial alignment with the first named members comprising a non-removable connection, said second named members being separable from each other and separable from the first named members adapting them for occupying a package of considerable less length than the over-all length of said fender brace, means for adjustably connecting the inner ends of said second named members whereby the fenders may be drawn toward each other, said last means and second named members forming a substantially inflexible connection between the two first named members.

6. The combination with a pair of spaced fenders of an automobile, of a fender brace comprising a pair of clamp members adapted to rest upon the fenders and engage their outer edges and project beyond their inner edges, a pair of tie rods adjustably connected at their inner ends, means for pivotally connecting the outer ends of the tie rods and the inner ends of said clamp members and means adjacent the inner edge of the fenders for engaging underneath the inner edges of the fenders for preventing any twisting of the fenders when they are drawn toward each other when being adjusted and for preventing movement of the fenders toward each other after they are adjusted, said last means together with said clamp members forming a jaw to engage around the inner edge of the fenders.

7. In a device for bracing fenders of an automobile, a pair of clamp portions adapted to rest upon the fenders each having means at its outer end for receiving and engaging the outer marginal bead of the fender, means for adjustably connecting the clamp portions together including tie rods having their inner ends screw threaded, a turn buckle for engagement with said screw threaded ends and having their outer ends pivotally connected to the clamp members and parts carried by the tie rods for engaging the under surface of the inner marginal bead of the fenders, said parts extending below the clamp portions and together therewith, forming a jaw for the inner marginal bead of the fenders for preventing the twisting of the fenders when being adjusted toward each other.

8. In a device for bracing fenders of an automobile, a pair of clamp portions adapted to rest upon the fenders each having means at its outer end for receiving and engaging the outer marginal bead of the fender, means for adjustably connecting the clamp portions together including tie rods having their inner ends screw threaded, a turn buckle for engagement with said screw threaded ends and parts forming a continuation of the tie rods for engaging the inner surface of the inner marginal bead of the fenders, said parts extending below the clamp portions and together therewith forming a jaw for the inner marginal bead of the fenders for preventing the twisting of the fenders when being adjusted toward each other.

9. The combination with a pair of spaced fenders of an automobile, of a fender brace comprising a pair of clamp members adapted to rest upon the fenders and engage their outer edges and project beyond their inner edges, a pair of tie rods adjustably connected at their inner ends, means for connecting the outer ends of the tie rods and the inner ends of said clamp members, and parts forming a continuation of the tie rods for engaging underneath the inner edges of the fenders for preventing any twisting of the fenders when they are drawn toward each other when being adjusted and for preventing movement of the fenders toward each other after they are adjusted, said last means together with the inner end of said clamp members forming a jaw to engage around the inner edge of the fenders.

10. A fender brace comprising a member having a hook at one end, said hook being adapted to engage the outer edge of the fender of an automobile, a second member loosely connected to the other end of said first named member and a projecting piece carried by said second named member and adapted to engage underneath the inner edge of the fender, said second named member extending in substantial alignment with the first named member and adapted when tensioned to effect a gripping action between said projecting piece and the first named member on the top and bottom sides of the inner edge of the fender.

11. A fender brace device comprising a member having a hook at one end, said hook being adapted to engage the outer edge of the fender of an automobile, a second member loosely connected to the other end of said first named member and a projecting piece carried by said device and adapted to engage underneath the inner edge of the fender, said second named member extending in substantial alignment with the first named member and adapted when tensioned to effect a gripping action between said projecting piece and the first named member on the top and bottom sides of the inner edge of the fender.

12. The combination with a pair of fenders of an automobile, of a fender brace comprising a pair of clamp members adapted to rest upon the fenders and engage their outer edges and project beyond their inner edges, a pair of tie rods connected at their outer ends to the inner ends of said clamp members whereby said rods are free to be moved relative to the clamp members when the parts are not installed, means for adjustably connecting the inner ends of said tie rods for forming a substantially inflexible connection between the inner ends of the fender clamp members, means adjacent the inner edge of the fenders for engaging underneath the inner marginal bead thereof and maintaining the fenders against lateral twisting movement when the fenders are drawn toward each other when the fender brace is being installed, the parts of the fender brace being readily adaptable for occupying a package of less length than the overall length of fender brace.

In testimony whereof he affixes his signature.

ELMER J. FIRQUAIN.